Sheet 1 - 3 Sheets
C. O. Read,
Making Wood Screws,
No. 88.
Reissued Oct. 7, 1846.
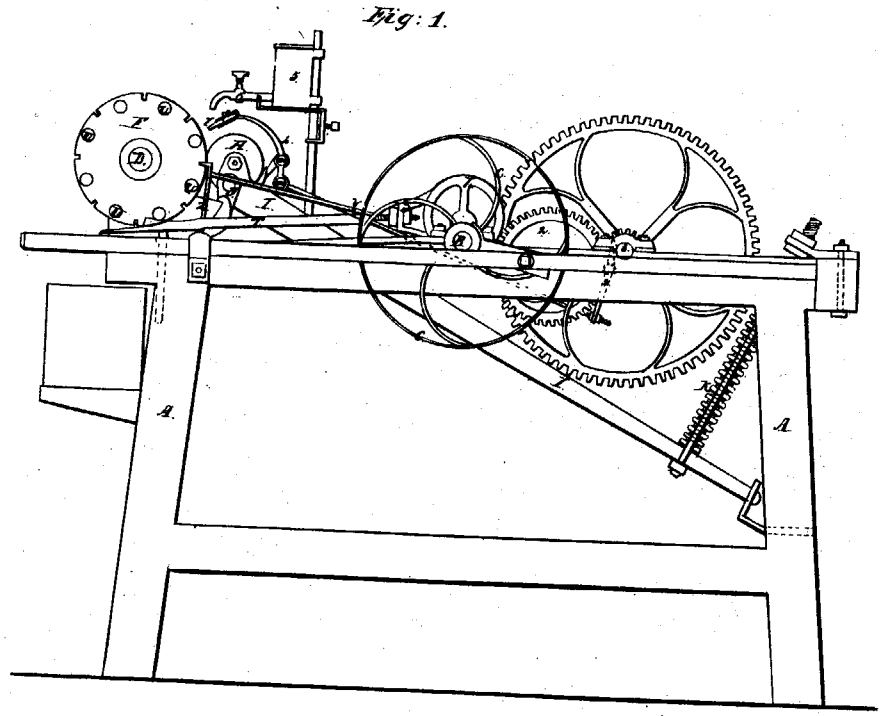
Fig: 1.
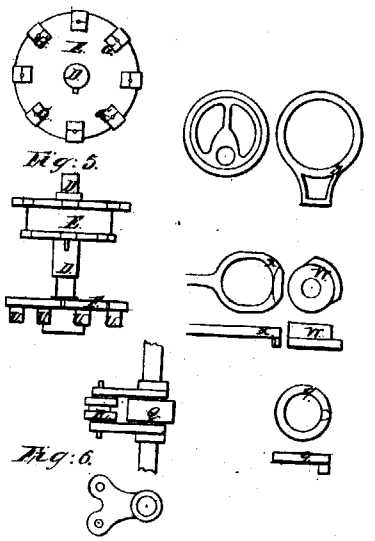
Fig: 5.
Fig: 6.
THE NORRIS PETERS CO., WASHINGTON, D. C.

Sheet 2 - 3 Sheets.
C. O. Read,
Making Wood Screws,
No. 88.
Reissued Oct. 7, 1846.
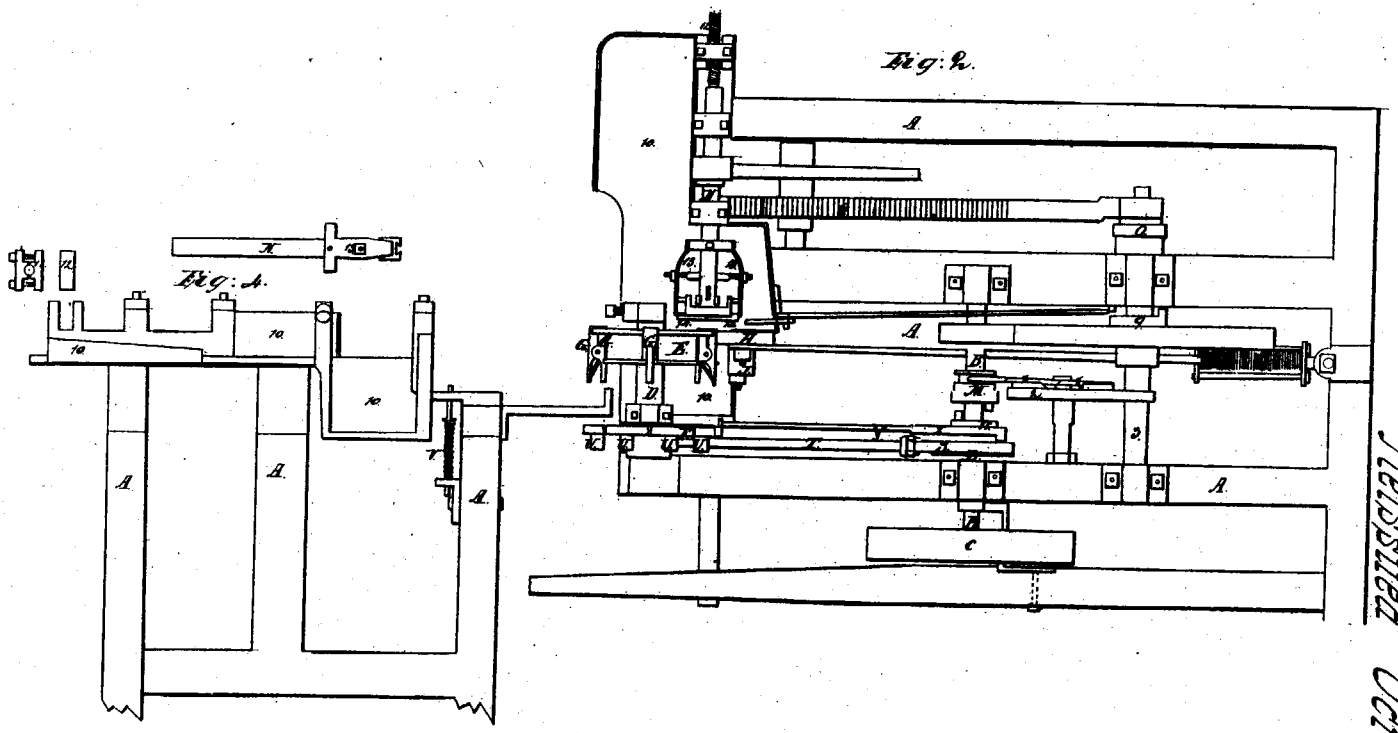
THE NORRIS PETERS CO., WASHINGTON, D. C.

Sheet 3 - 3 Sheets
C. O. Read,
Making Wood Screws.
No. 88.
Reissued Oct. 7. 1846.
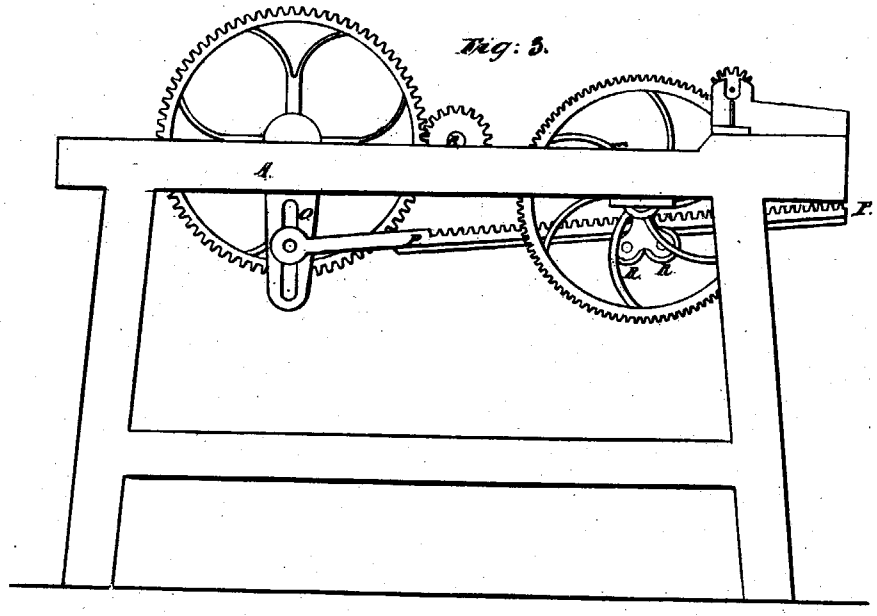
THE NORRIS PETERS CO., WASHINGTON, D. C.

UNITED STATES PATENT OFFICE.

CLEMENT O. READ, OF MILFORD, MASSACHUSETTS.

IMPROVEMENT IN MACHINES FOR MANUFACTURING WOOD-SCREWS.

Specification forming part of Letters Patent No. 516, dated December 15, 1837; Reissue No. 88, dated October 7, 1846.

*To all whom it may concern:*

Be it known that I, CLEMENT O. READ, of Milford, in the county of Worcester and State of Massachusetts, have invented new and useful Improvements in the Machine for Cutting the Threads on Wood-Screws; and I do hereby declare that the following is a full, clear, and exact description of the principle or character which distinguishes them from all other things before known, and of the manner of making, constructing, and using the same, reference being had to the accompanying drawings, making part of this specification, in which—

Figure 1 is an elevation of the machine; Fig. 2, a plan; Fig. 3, an elevation of the side opposite to Fig. 1; Fig. 4, a cross-section; Fig. 5, end view and top view of the wheel of clamps, and Fig. 6 sections of the separate parts.

The same letters indicate like parts in all the figures.

In the machines for this purpose made prior to my invention the prepared blanks were either introduced one by one in a pair of jaws to be held during the cutting of the thread by dies or cutters, the jaws either rotating the blank or holding it stationary, while the cutting or chasing dies were made to rotate; or the prepared blanks were introduced in holes made in the face or the flange of a wheel to be, by the rotation of the wheels, carried around successively to the cutting-dies, and there, during the chasing operation, held by a turn-screw introduced in the nick previously cut in the head. These various operations were admitted to be imperfect, the former because the attendant was required to be constantly watching the operation of the machine to be ready at the moment of the completion of one screw to remove it and introduce another blank, and the other because the turn-screw cannot singly hold the blank with sufficient force and in a true central position during the presentation and rotation of the cutting and chasing dies, the least defect in the form of the head of the blank changing its position, and, besides, too much attention is required on the part of the attendant to introduce the blanks in the wheel with the nicks in a true direction to insure the entrance of the turn-screw in the nicks as the blanks are presented to it.

These obvious defects have been remedied by my improvement, which consists in the application of a series of jaws or other analogous device, into which the perforated blanks are introduced by an attendant during the operations of threading, and by which they are carried around and in succession presented to the action of the cutting or chasing dies, the jaws when passing around to present a blank to the cutters or chasers being made to grip with sufficient force to prevent the blank from turning while under the chasing operation.

The machine is supported by a frame, A A, on the different figures. A cast-iron bed-piece, 10 10, Fig. 2, is placed on this frame, and on this is fixed the mandrel N for the dies 14, and the wheel for the jaws, and the several fixtures required for the same. The jaws G are usually eight in number. The lower or inside one of each pair is firmly secured or affixed at equal distances apart into the surface of the cast-iron wheel E on the shaft D. The outside jaw is hung to the other by a joint near the center, so that it may freely open and shut to receive and discharge the screw. A feather-spring is placed between one end of the jaws in order to press the other end where the screw is held, a groove being formed in this end of the jaws suited to the size and shape of the head of the screw. When the blank, after being placed between the jaws, is brought to the place for cutting the screw, the outer jaw is pressed firmly against the blank by the roll H, attached to the lever I. This lever is bolted to the stand J. The roll H is made to act against the jaws G with a force sufficient to hold the blank placed between them immovable while the thread is being formed. The force of the pressure is regulated by the spiral spring K at the opposite end of the lever I. The blank being thus held in a proper position for cutting, the screw is cut by the dies 14, fitted in a block fastened to the end of the mandrel N. These dies are pressed against the blank by one end of the spring 13. The other end is fastened to a collar which may be moved along the shaft, and the ends of the springs resting on the dies thus slipped off whenever the dies may require to be taken out for repairing or any other purpose. The pressure of the springs is regulated by the bolt passing through them and the mandrel. A revolving motion backward and forward is given to the spindle by the crank O, rack P, and intermediate wheels, as may readily be seen by the drawings, Figs. 1 and 2. A leading-screw, 11, of the requisite fineness, running in a pair of caps screwed together and forming a box, 12, is attached to the mandrel to cause the dies to traverse backward and forward on the blank in a proper manner. The forms of the die, springs, mandrel, &c., are similar to those of machines already in use. The rack P is made to act directly from the crank O to the pinion Q, against which it is held by the rolls R, (see Figs. 3 and 6,) dispensing with the slide and sweep generally used, thereby avoiding a degree of friction and obtaining a more equable motion. The rack is moved to or from the center of the crank according to the number of revolutions required to cut a screw the desired length. The screw being cut, the next motion is to remove that screw and bring another to its place. This is done by causing the shaft and wheel on which the jaws are placed to revolve one-eighth of a revolution, thus bringing the next pair of jaws, in which the blank is previously placed, on a line with the mandrel N, ready for cutting. The manner in which this is effected is as follows: An eccentric, L, is placed loose on the main shaft B, of a size and sweep to give the required motion. Around this eccentric is fitted a ring, S, with a projection on one side, to which the bar T is fastened by nuts or a screw. The opposite end of this bar acts against the pins U, eight in number, in the iron plate F. The bar is held up to the pins by the spring V, (see Fig. 4,) one revolution of the eccentric L turning the shaft D and fixtures thereon one-eighth of a revolution, and thereby bringing the blank in the next pair of jaws in the proper position for cutting.

To hold the shaft steady while the screw is being cut, a spring with a catch, Z, is made to drop into racks cut in the edge of the plate F. This spring-catch is drawn and held out of the nick while the plate is turning by a cam, W, fastened to the eccentric L, acting on a ring or strap of iron, X, which is connected with the catch by a rod, Y. Motion is given to the eccentric L at the proper time by a sliding clutch, M, on and turning with the main shaft B. This clutch is brought by the lever 1 sufficiently near to take hold of the cam W. This lever is hung on the stud of the wheel 2, and is moved to bring the clutch into gear by a knob screwed inside the rim that is attac to the wheel acting on the opposite end of the lever, and after remaining long enough for one revolution is brought back by the edge of the rim acting against the lever. This wheel 2, as may be seen, is carried by a small wheel on the crank-shaft 3. These wheels may be of different proportions—as two to one, three to one, four to one, &c.—according to the number of times it is desired to have the dies run over the blanks in forming the screws.

The wheels connecting the main and crank shafts may be in proportion to either four or five to one.

In order to cut the screw smooth and with as little wear as possible to the dies oil is applied to the screw during the process. A crooked arm, 4, hung on a joint, has a piece of sponge or soft leather, 7, fastened to the end. Over this a vessel of oil, 5, is placed, and by turning a cock, 6, the oil is made to drop on the sponge or leather as fast as required. The leather is brought to touch the screw once at every revolution of the crank-shaft by a cam, 9, on that shaft acting against one end of a small lever, 8, marked in the drawings by dotted lines, and hung to the frame near the center of the said lever, the opposite end of which is connected with the aforesaid crooked arm 4 by a small rod, as seen in the drawings.

Most of the operative parts of the machine as herein described are such as are well known and are used in other machines.

What I claim as my invention, and desire to secure by Letters Patent, is—

The arrangement of a series of clamps or other analogous devices on a wheel, in combination with the cutting or chasing dies, substantially as described, whereby the prepared blanks are gripped and in succession presented to the cutting or chasing dies, as described.

CLEMENT O. READ.

Witnesses:
LEMUEL LELAND,
SETH P. CARPENTER.